(12) United States Patent
Srivastava

(10) Patent No.: US 7,707,236 B2
(45) Date of Patent: Apr. 27, 2010

(54) METHODS AND APPARATUS FOR AN EFFICIENT FLOATING POINT ALU

(75) Inventor: Saurbh Srivastava, Karnataka (IN)

(73) Assignee: Analog Devices, Inc., Norwood, MA (US)

( * ) Notice: Subject to any disclaimer, the term of this patent is extended or adjusted under 35 U.S.C. 154(b) by 1078 days.

(21) Appl. No.: 11/157,650

(22) Filed: Jun. 21, 2005

(65) Prior Publication Data

US 2006/0036667 A1 Feb. 16, 2006

Related U.S. Application Data

(60) Provisional application No. 60/601,383, filed on Aug. 13, 2004.

(51) Int. Cl.
G06F 7/42 (2006.01)

(52) U.S. Cl. .................................................... 708/505

(58) Field of Classification Search ................. 708/495, 708/505
See application file for complete search history.

(56) References Cited

U.S. PATENT DOCUMENTS

| 4,488,252 A | 12/1984 | Vassar |
| 5,136,536 A | 8/1992 | Ng |
| 5,892,697 A | 4/1999 | Brakefield |
| 6,094,668 A | 7/2000 | Oberman |
| 2003/0055859 A1* | 3/2003 | Seidel et al. ................ 708/505 |

FOREIGN PATENT DOCUMENTS

WO WO 98/06031 A 2/1998

OTHER PUBLICATIONS

Supplementary Search Report and European Search Opinion from European Application No. 05783849.2 mailed Oct. 24, 2008.
Search Report and Written Opinion from corresponding International Application No. PCT/US05/28202 mailed Dec. 8, 2005.
English translation of Office Action issued in connection with corresponding Chinese Patent No. 200580034798.0, mailed Nov. 28, 2008, 6 pages.
English translation of Notice of Grant of Right for Patent Invention issued in connection with corresponding Chinese Patent No. 200580034798.0, mailed May 22, 2009, 2 pages.
Examination Report for European Patent Application No. 05783849.2, mailed Jan. 14, 2010, 4 pages.

* cited by examiner

Primary Examiner—Chuong D Ngo
(74) Attorney, Agent, or Firm—Goodwin Procter LLP

(57) ABSTRACT

The present invention provides an improved technique for performing a near processing path exponent difference in an arithmetic logic unit (ALU) of a microprocessor. In one embodiment, an apparatus having a separate logic circuit for near processing path and far processing path subtraction generates exponent difference signals using only two least significant bits of exponents of the two floating point operands to perform the exponent difference.

5 Claims, 2 Drawing Sheets

METHODS AND APPARATUS FOR AN EFFICIENT FLOATING POINT ALU

RELATED APPLICATION

Benefit is claimed under 35. U.S.C. 119(e) to U.S. Provisional Application Ser. No. 60/601,383, entitled "Methods to improve the speed of 32/40 bit floating point ALU", by Saurbh Srivastava, filed Aug. 13, 2004, which is herein incorporated in its entirety by reference for all purposes.

FIELD OF THE INVENTION

The present invention relates to floating point arithmetic within a microprocessor, and more particularly to an add/subtract pipeline within a floating point unit.

BACKGROUND OF THE INVENTION

Generally, a floating point operand consists of three elements, the first being a sign bit, the second being mantissa bits, and the third being an exponent. For example, a 32 bit floating point operand is represented according to the IEEE (institute of electrical and electronic engineers) standard as follows:

$$\underbrace{(-1)^S}_{sign} \times \underbrace{1.M23}_{mantissa} \times \underbrace{2^{(E8-127)}}_{exponent}$$

Typically, a floating point addition operation includes an arithmetic operation on two floating point operands. For example, the arithmetic operation on the two floating point operands includes the following steps:
1. Making the exponents of the two floating point operands (operands) same by downshifting the mantissa of the operand having a lower exponent.
2. Adding the mantissas of both the operands (with or without a rounding operation) and outputting an added number.
3. Downshifting the added number by one bit if the added number overflows (for example, in a 32 bit addition, the added number overflows if the added number exceeds 32 bits).

The above outlined floating point addition operation requires a full downshifter, an adder, and a one-bit downshifter.

Similarly, the floating point subtraction operation also generally includes an arithmetic operation on the two operands. Conventional techniques perform the subtraction operation using two parallel processing paths, referred to as the far processing path and the near processing path, and selecting the output of one of the processing paths as the subtraction result.

The near processing path operation is used, if the difference between the exponents of both the operands is one or zero. Since the exponent difference is one or zero, downshift operation of a maximum of one bit is needed to make the exponents equal. After making the exponents equal, shifted mantissas are subtracted from other remaining mantissas. In such an instance, the most significant bit (MSB) can be at any bit location in the subtraction result. As a result, one full upshifter may be required to bring the MSB to a 1st location (and the exponent is subtracted by the amount equal to an upshift). The 1st location is referred from the left side of the subtracted number. For example, in a 32 bit subtractor, the MSB of the result can be anywhere between the 32nd bit to the 1st bit. In such a case, the MSB has to be upshifted to a highest of 32nd bit location and this generally requires a 32 bit upshifter. Thus, near processing path subtraction can require a one 1 bit downshifter, a one 32 bit subtractor, and a 32 bit upshifter.

The far processing path operation is used if the difference between the exponents of both the operands is more than one. The exponent difference of the far processing path can be more than one and can be any number. As a result, a full downshifter is required to make the exponents of the two operands same by downshifting the mantissa. The mantissa of the operand having a smaller input exponent is then subtracted from the mantissa of the other operand. The subtracted result can then require a 1 bit upshift operation. As a result, the far processing path subtraction operation can require a full downshifter, a full subtractor, and a 1 bit upshifter. For example, a 32 bit far processing path subtraction can require a 32 bit downshifter, a 32 bit subtractor, and a 1 bit upshifter.

Therefore, the above near processing path floating point subtraction operation can either require an exponent subtractor or any other logic to detect the exponent difference of the two operands. The near processing path does the subtraction if the mantissa difference is 0, 1, or −1. This exponent subtraction logic time can be significant. During this time, the near processing path remains idle, i.e., it will be waiting for the outcome of the exponent difference logic. This can significantly add to the overall subtraction operation time when using the above-described near processing path and the far processing path technique. Further, operations, such as rounding, upshift error correction, underflow detection, and the downshifted mantissa select can also take significant amount of additional logic time when using the above far processing path and near processing path technique for the floating point subtraction.

SUMMARY OF THE INVENTION

The present invention provides an improved technique for performing exponent difference estimation, which can be used to generate subtraction result equivalent to near processing path of arithmetic logic unit (ALU) of a microprocessor. In one embodiment, a circuit having separate logic for the near processing path and far processing path subtractions generates exponent difference signals for the near processing path using only two least significant bits of exponents of the two floating point operands.

DETAILED DESCRIPTION OF THE INVENTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore not to be taken in a limiting sense, and the scope of the present invention is defined only by the appended claims.

Figure 1:
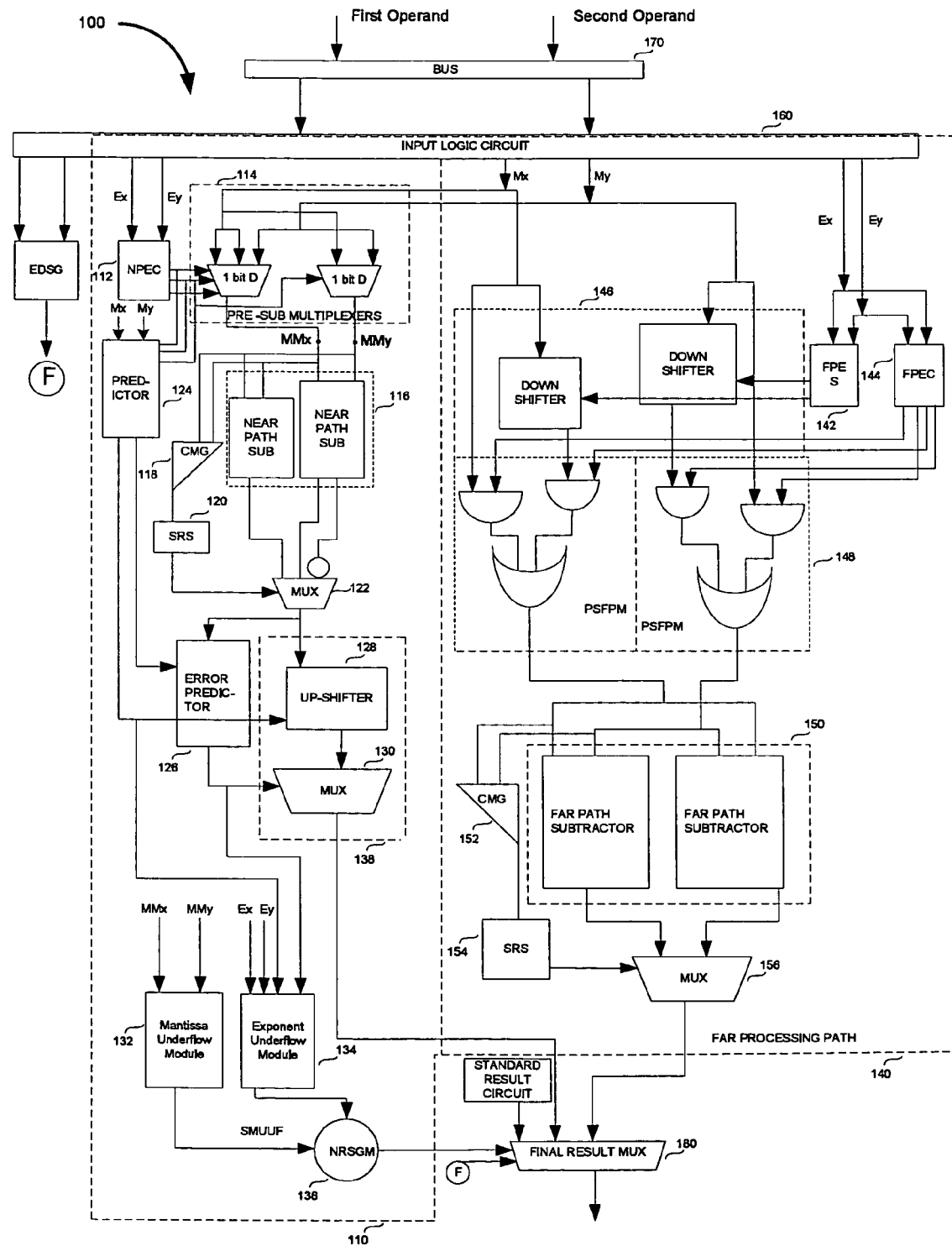
FIG. 1 illustrates a block diagram of an apparatus for implementing parallel operations in an ALU according to an embodiment of the present subject matter.

Improvement Scheme for Predicting the Exponent Difference for Near Processing Path Referring now to FIG. 1, there is illustrated a block diagram of an apparatus 100 for implementing parallel operations for performing subtraction of two floating point operands in an arithmetic logic unit (ALU) of a microprocessor according to an embodiment of the present invention. As shown in FIG. 1, the apparatus 100 includes a near processing path 110, a far processing path 140, an input logic circuit 160, an input data bus 170, and a final result multiplexer 180.

Further as shown in FIG. 1, the near processing path 110 includes a near processing path exponent comparator (NPEC) 112, a pair of near processing path pre-subtraction multiplexers 114, a pair of near processing path subtractors 116, a near processing path MSB/carry generation circuit (CMG1) 118, a near processing path subtraction result selector (SRS) 120, a post subtraction near processing path multiplexer 122, an upshift predictor 124, an upshift error prediction module 126, a near processing path post subtraction upshifter (NPPPSU) 138, a mantissa underflow signal generation module 132, an exponent underflow signal generation module 134, and a normal result signal generation module 136. As shown in FIG. 1, the near processing path post subtraction upshifter 138 includes an upshifter 128 and a multiplexer 130.

The far processing path 140 includes a far processing path exponent subtractor (FPES) 142, a far processing path exponent comparator (FPEC) 144, a pair of downshifters 146, a pair of pre-subtraction far processing path multiplexers (PS-FPM) 148, a pair of far processing path subtractors 150, a far processing path subtraction MSB/carry generation circuit (CMG2) 152, a far processing path SRS 154, and a post subtraction far processing path multiplexer 156.

In operation, in one example embodiment, the input data bus 170 receives first and second floating point operands and provides them to the input logic circuit 160. The input logic circuit 160 then computes a sign-bit, a mantissa, and an exponent associated with each of the first and second floating point operands and provides them to the near processing path 110 and the far processing path 140 for computing a difference between the first and second floating point operands. In these embodiments, the input logic circuit 160 coupled to the input data bus 170 receives the first and second floating point operands from the input data bus 170 and provides a plurality of computed exponents and mantissas corresponding to the received first and second floating point operands.

The present invention reduces the time required by almost half the time needed for conventional techniques for computing whether the near path exponent difference is equal to 0, 1, or −1. In addition, the new scheme requires less hardware when compared with the conventional schemes to perform such ALU operations.

Upon receiving the exponents associated with the first and second floating point operands, the near processing path 110 generates a plurality of exponent difference signals. In one embodiment, the near processing path 110 uses the following equations, which illustrates that only 2 least significant bits of exponents are required to generate the needed exponent difference signals to perform the ALU operation.

$GT$=(EXPsame[1] and $X$EXP[0] and ~$Y$EXP[0]) or (EXPdiffr[1] and YEXP[0] and ~XEXP[0]);

$LT$=(EXPsame[1] and $Y$EXP[0] and ~$X$EXP[0]) or (EXPdiffr[1] and XEXP[0] and ~YEXP[0]);

EQ=EXPsame[0];

Wherein EXPsame[i]=XEXP[i] xnor YEXP[i]; EXPdiffr[i]=XEXP[i] xor YEXP[i]; and GT, LT, and EQ are the exponent difference signals generated by above equations, which are equivalent to the exponent difference signals of +1, −1, and 0. They are basically a prediction of difference between XEXP and YEXP, wherein XEXP and YEXP are the exponents of first and second floating point operands. This equivalence between GT, LT, and EQ and +1, −1, and 0 is conditional, i.e., the equivalence is only when the difference between XEXP and YEXP is equal to +1, −1, or 0. This means that if the difference between any two numbers is equal to +1, −1 or 0 then the above equations can be used to compute actual exponent differences. Since, the near processing path result is selected for such cases only (that is when exponent difference is +1, −1, or 0). Therefore for a selected result, when the predicted exponent difference result is correct, the final output results ends up being correct. Hence, the exponent difference for the near path subtractor 110 can be generated using the above equations rather than using the current techniques, which can take significantly longer time and larger silicon area.

Using this technique for the near path computation will result in the same exponent difference computation if the exponent difference of any two numbers is equal to +1, −1, or 0. Whereas the result would be different if the exponent difference of any two numbers is not equal to +1, −1, or 0. This does not affect the final outcome of the subtractor as a final multiplexer does not take a near path output for other exponent differences. Using this technique for the near path exponent difference will result in a faster prediction and conditionally accurate difference signal and does not produce the same result for all cases of exponent differences.

In some embodiments, NPEC 112, the near processing path 110 generates the GT, LT, and EQ exponent difference signals upon receiving the exponents associated with the first and second floating point operands via the input logic circuit 160.

In some embodiments, the upshift predictor 124 in the near processing path 110 then generates a near processing path upshift value based on the generated plurality of exponent difference signals and the mantissas of both the operands.

In some embodiments, the pair of near processing path pre-subtraction multiplexers 114 generates a pair of near processing path normalized mantissas based on the generated GT, LT, and EQ exponent difference signals and the received mantissas of the first and second floating point operands from the input logic circuit 160.

In these embodiments, the pair of near processing path subtractors 116, i.e., subtracting one number with rounding and the other without rounding, then generates a pair of subtracted values based on the generated pair of near processing path normalized mantissas. The CMG1 118 then generates the MSB and the carry using the generated pair of near processing path normalized mantissas and the rounding mode (that is the inputs signals to the ALU) and any discarded bits from the pre-subtraction multiplexer (pre-subtraction multiplexer either passes the mantissas directly or downshifts by one bit, in case of a one bit downshift, one LSB bit from the downshifted mantissa gets discarded).

Also in these embodiments, the post subtraction near processing path multiplexer 122 then selects a near path subtracted value from the pair of subtracted values based on the select signal.

The upshift predictor 124 receives the GT, LT and EQ exponent difference signals from the NPEC 112 and the mantissas of the first and second floating point operands from the input logic circuit 160 substantially simultaneously and generates an upshift prediction signal and an error matching pattern. In some embodiments, the upshift predictor 124 generates an upshift prediction signal and an error matching pattern upon receiving the GT, LT, and EQ exponent difference signals and the mantissas associated with the first and second floating point operands.

Further in these embodiments, the upshift error prediction module 126 then generates a prediction error signal based on the error matching pattern and the near processing path subtraction value. The near processing path post subtraction upshifter 138 then generates a near processing path upshifted value based on the near processing path subtraction value, the upshift prediction signal, and the prediction error signal.

In some embodiments substantially simultaneously, upon receiving the exponents associated with the first and second floating point operands from the input logic circuit 160, the far processing path 140 subtracts the exponents and outputs an amount of downshift required for mantissa of a smaller exponent. The far processing path 140 then generates a pair of far processing path downshifted mantissa select signals for the mantissas associated with the first and second floating point operands. Further, the far processing path 140 generates a pair of far processing path direct mantissa select signals for the mantissas associated with the first and second floating point operands based on the exponents associated with the first and second floating point operands.

In these embodiments, the FPES 142 receives the exponents of the first and second floating point operands from the input logic circuit 160, subtracts the exponents associated with the first and second floating point operands and outputs the pair of expected downshift values. The FPEC 144 then generates the pair of far processing path downshifted mantissa select signals for mantissas associated with the first and second floating point operands. Further, the FPEC 144 generates the pair of far processing path direct mantissa select signals for the mantissas associated with the first and second floating point operands based on the exponents associated with the first and second floating point operands.

Also in these embodiments, the pair of downshifters 146 then downshifts the mantissas associated with the first and second floating point operands based on the pair of expected downshift values. Further, the pair of downshifters 146 discards mantissa bits that are outside the mantissa data range after downshifting. The PSFPM 148 coupled to the pair of downshifters 146 selects a pair of values based on the pair of far processing path downshift mantissa select signals, the pair of far processing path direct mantissa select signals, the mantissas associated with the first and second floating point operands, and the pair of downshifted mantissas and outputs a pair of far processing path normalized mantissas.

Further in these embodiments, the pair of far processing path subtractors 150 then generates a pair of subtracted values (i.e., one subtracted value with rounding and the other without rounding) based on the pair of far processing path normalized mantissas. The CMG2 152 then generates the MSB/carry using the pair of far processing path normalized mantissas. The far processing path SRS 154 then generates a select signal based on the generated MSB/carry, the discarded bits from the pair of downshifters 146, and a rounding mode input value, which is an input to this subtraction logic.

Furthermore in these embodiments, the post subtraction far processing path multiplexer 156 then selects a far processing path subtracted value from the pair of subtracted values based on the select signal and outputs a far processing path subtraction value. The far processing path multiplexer 156 adjusts the selected far processing path subtracted value if the MSB is zero and performs a 1-bit upshift.

Further, the near processing path 110 computes an exponent difference of the first and second floating point operands by subtracting the exponents of the first and second floating point operands. The near processing path 110 then generates an exponent difference signal based on the computed exponent difference. The final result multiplexer 180 then selects either the far path subtraction result, the near path subtraction result, or the standard result (in case of an exponent/mantissa underflow, standard result contains all zero exponent and zero mantissa bits, sign bit can be 1 or 0) based on the generated exponent difference signal and the status of the result to be selected.

In some embodiments, the final result multiplexer 180 then selects either the far processing path subtraction value or the near processing path post subtraction upshifted value or the standard result for underflow based on an incoming exponent difference value obtained by computing the exponent difference using the exponents associated with the first and second floating point operands. In some embodiments, final result multiplexer 180 also selects the near processing path upshifted value as a result of the status of the result computed by NRGSM 136.

In one embodiment, the final result multiplexer 180 selects the near processing path upshifted value as the result of the subtraction of the first and second floating point operands when the exponent difference is equal to 1, −1, or 0 and the final result has not produced an underflow (i.e., the exponent/mantissa underflow). In this embodiment, the final result multiplexer 180 selects the far processing path subtraction value as a result of the subtraction of the first and second floating point operands, when the exponent difference is greater than 1 and the final result has not produced the underflow condition.

Figure 2:
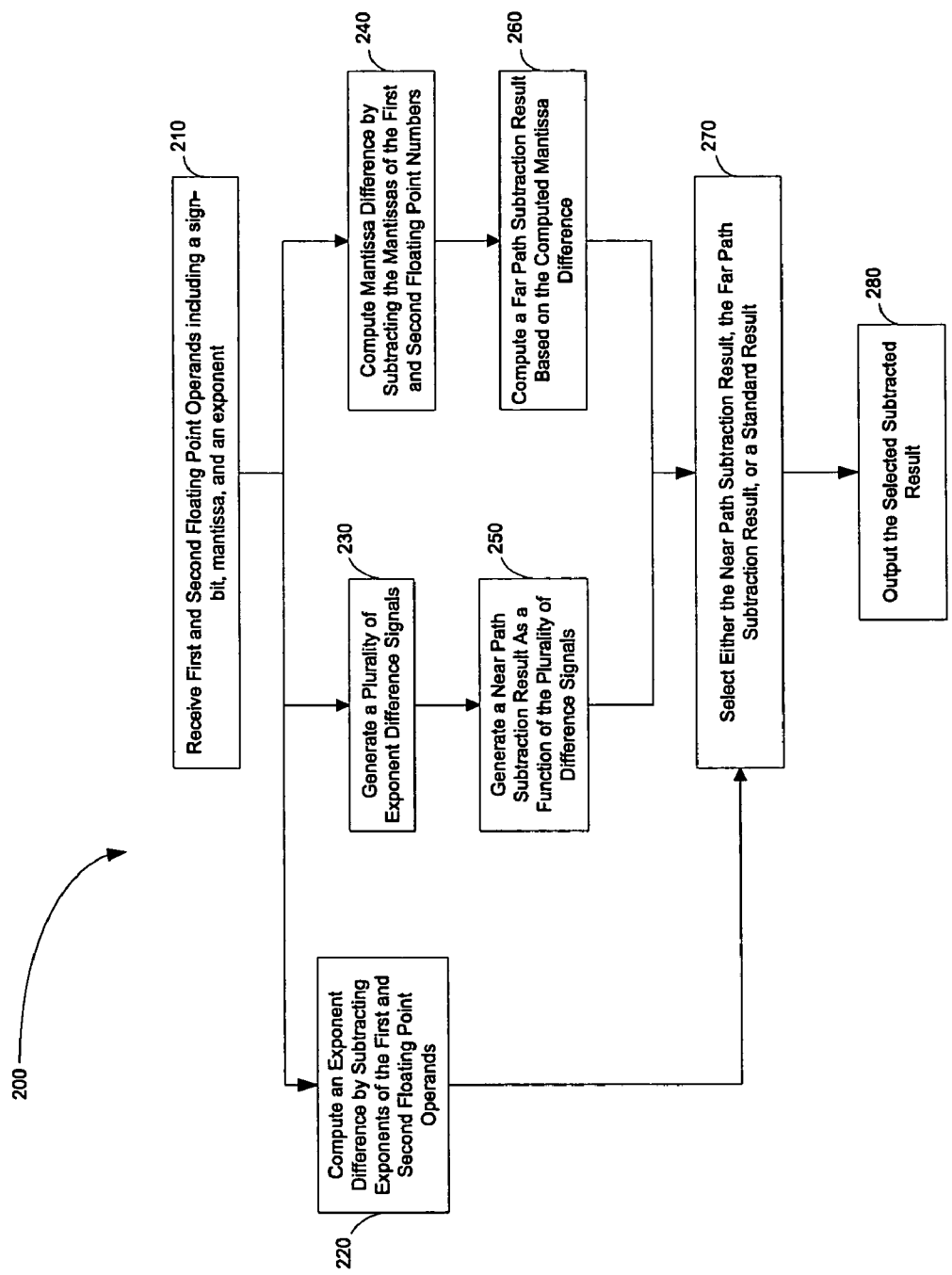
FIG. 2 illustrates a flowchart according to an embodiment of the present subject matter for implementing the parallel operations of FIG. 1.

FIG. 2 is a flowchart illustrating an example embodiment of a method 200 of implementing the parallel operations for computing difference of floating point operands according to the present invention. At step 210, the method 200 receives first and second floating point operands. Each of the received first and second floating point operands has a sign-bit, a mantissa, and an exponent. At step 220, an exponent difference is computed by subtracting the exponents of the first and second floating point operands.

At step 230, a plurality of exponent difference signals is generated as a function of the pattern of exponents in the first and second floating point operands. In some embodiments, the plurality of exponent signals are computed by first generating a GT exponent difference signal if the exponents of the first and second floating point operands have a difference of 1, −1, or 0 and also if there is an indication of having a difference of +1 between the first and the second floating point operands. An LT exponent difference signal is generated if the exponents of the first and second floating point operands have a difference of 1, −1, or 0 and also if there is an indication of having a difference of −1 between the first and second floating point operands. An EQ exponent difference signal is generated if the exponents of the first and second floating point operands have a difference of 1, −1, or 0 and further indicates having a difference of 0 between the first and second floating point operands.

In some embodiments, the plurality of exponent difference signals are obtained by generating the GT, LT, and EQ exponents difference signals as a function of the pattern of exponents in the first and second operands using the following equations:

GT=(EXPsame[1] and XEXP[0] and ~YEXP[0]) or (EXPdiffr[1] and YEXP[0] and ~XEXP[0]);

LT=(EXPsame[1] and YEXP[0] and ~XEXP[0]) or (EXPdiffr[1] and XEXP[0] and ~YEXP[0]);

EQ=EXPsame[0].

At step 250, a near path subtraction result is generated as a function of the generated plurality of exponent signals and mantissa of $1^{st}$ and $2^{nd}$ operands. At step 240, a mantissa difference is computed by subtracting the mantissas of the first and second floating point numbers. In some embodiments, a mantissa associated with a smaller exponent is then determined using the exponent associated with the first and second floating point operands. Normalized mantissas are then generated by shifting the mantissa associated with the smaller exponent. The mantissa difference is then computed by subtracting the normalized mantissas associated with the first and second floating point operands. At step 260, a far path subtraction result is computed based on the computed mantissa difference. In some embodiments, an exponent difference is computed by subtracting the exponents associated with the first and second floating point operands. The far path subtraction result is then computed based on the computed mantissa difference if the computed exponent difference is not equal to 1, −1, or 0.

At step 270, either the far path subtraction result, the near path subtraction result, or a standard result is selected as a function of the computed exponent difference and the status of the subtraction result to be selected. In these embodiments, the standard result is selected if the near path subtraction result is an exponent or a mantissa underflow. At step 280, the selected subtracted result is outputted by the ALU.

Although the method 200 includes steps 210-280 that are arranged serially in the exemplary embodiments, other embodiments of the present invention may execute two or more blocks in parallel, using multiple processors or a single processor organized as two or more virtual machines or sub-processors. Moreover, still other embodiments may implement the blocks as two or more specific interconnected hardware modules with related control and data signals communicated between and through the modules, or as portion of an application-specific integrated circuit. Thus, the above exemplary process flow diagrams are applicable to software, firmware, and/or hardware implementations.

Improved MSB and Carry Generation Scheme

The MSB/carry signals of the near/far path subtractors 110 and 140 are required to select a right subtraction result with right data alignment. These signals are generated substantially earlier than the subtraction result so that the subtraction result select logic SRS 120/154 can produce select signals at an appropriate time.

This is achieved by having a separate carry generation circuit in parallel with the pair of subtractors 116 and 150. Since the MSB/carry generation circuit 118 only generates the carry, its internal circuit can be much simpler than a full subtractor circuit with gates having lesser output fanout. As a result, its inside signals are generated significantly faster than the signals generated by the near/far path subtractors 116 and 150. The operation of the improved MSB/carry generation technique is explained in more detail with reference to FIG. 1 described above.

Error Correction Signal Generation for Near Processing Path Upshifter

In the near processing path 110 a MSB of a subtraction result may not be at the last bit location of data. The upshift predictor 124 anticipates the amount of upshift required. The upshift predictor 124 informs the amount of upshift magnitude with a possible error of one bit, for example, if it predicts that the upshift of 20-bits is required, when actually the MSB may be 20 or 21-bits behind the last bit location. After up shifting, if the resultant mantissa does not have 1 at the MSB, then it means that the upshift predictor 124 gave one less prediction, and one more bit of upshift is required. Therefore, MSB of an upshifter (128) output acts like a control signal for a 1 bit upshifter. The MSB of the upshifter 128 output passes via the buffers to become strong enough to drive a big select logic.

To save the time wasted in such buffering the MSB has to be generated before the rest of the bits. In the above-described technique, the upshift predictor 124 shown in FIG. 1, not only generates the magnitude of upshift required (which may be one less than what is required) but also generates an array PRED [n-1:0], which has 1-bit high and rest of the bits low (i.e., one-hot). The position of the high bit is where the predictor predicts the MSB location. Generally, the upshift predictor 124 prediction generates an upshift number in two steps as outlined below.

1. Generates a pattern indicating the MSB prediction, for example, for an 8 bit number, if the upshift predictor 124 predicts the location of the first one as $3^{rd}$ last bit, then the generated pattern will be 001xxxxx, where x denotes either 0 or 1.
2. Generates the upshift number from the above generated pattern.

Generating such a pattern using an additional circuit, in which only one bit in the data has a number 1 to indicate the predicted first nonzero bit, using the output of first pattern does not take additional time and the new pattern can be generated in parallel with the above indicated step 2, as both step 2 and the additional circuit are independent. The following illustrates one example pattern that can be generated for an 8 bit mantissa using the upshift predictor 124.

Pattern generated for 8 bit mantissa: patt[7:0]

New_patt[7:0]=patt[7:0]|{0patt[7:1]}| . . . {0,0,0,0,0, 0,0,patt[7]}

PRED=New_patt[7:0]^{0,New_patt[7:1]}

Wherein "^" denotes XOR operation and "|" denotes an OR operation.

It can be seen that generating the above pattern does not require any additional time of the upshift predictor 124.

If the upshift predictor 124 is correct then the position of 1 in PRED[n-1:0] and position of MSB in subtraction result will match as illustrated in the equation below:

Correct_prediction=|(PRED[n-1:0] & subtraction_result [n-1:0]);

Wherein "&" refers to an AND operation.

It can be seen that the generation of Correct_prediction signal takes lesser time than the upshifter, as a result the extra upshift signal will be ready by the time the upshifter completes its operation.

Mantissa Underflow Signal Generation

The decision to accept a subtraction result or not depends on the mantissa underflow signal. If the subtraction result is 0 then it means it is a mantissa underflow situation. If such a situation (mantissa underflow) occurs then a standard result, such as IEEE, is selected as the final result and not based on the computed subtraction result.

A faster scheme has been developed to generate the mantissa underflow signal using the Mantissa underflow signal generation module 132 shown in FIG. 1. The underflow generally happens, if the result of mantissa subtraction is 0. This means, if a desired subtraction result is A−B (wherein A and B are the normalized mantissas associated with the first and second floating point operands) and, if A=B or if the desired result is A−B−1 (with rounding) and if A=B+1. The mantissa underflow module (132) determines the above conditions (i.e., A=B+1 or A=B or rest) parallel to subtraction instead of waiting for the subtraction result for its analysis. Further, conditions of A=B and A=B+1 are detected by inputting the normalized mantissas A and B to a "0, 1 difference detector algorithm", such as the one below:

$XD[n-1:0]=(\{1'b0,B[n-1:1]\}^{\wedge}\{1'b0,A[n-1:1]\}^{\wedge}(\sim B[n-1:0]|A[n-1:01]));$ $YD[n-1:0]=(\{1'b0,B[n-1:1]\}^{\wedge}\{1'b0,A[n-1:1]\}^{\wedge}(\sim A[n-1:0]|B[n-1:0]));$

YDIF=&YD;

XDIF=&XD;

(A=B case.) EQ=YDIF & XDIF;

(A=B+1 case.) GT=~YDIF & XDIF;

Mantissa_Underflow=select_AeqB_or_BeqA ? EQ: GT

Exponent Underflow Signal Generation

The exponent underflow signal outputted by the exponent underflow signal generation module 134 is required to decide whether to take the subtraction result as a final result or to drive out a special result of the underflow. As described earlier, after completing the subtraction by the ALU, the MSB of the subtraction result may fall behind the last bit location and to make it IEEE compatible, the subtraction result may have to be upshifted. To take care of the upshift, the exponent has to be decremented by a same amount (equal to upshift of mantissa). If magnitude of reduction causes exponent to become 0 or negative, then it is considered to be a situation of exponent underflow.

In the conventional schemes, the up-shift amount is first subtracted from the original exponent then the subtraction result is analyzed to check whether the subtraction result is 1, 0 or a negative number. After this the exponent underflow is determined by the using the following equation.

Exponent_underflow=(1 or 0 or negative) & (one bit upshift correction required)|(0 or negative) & (no upshift correction is required), In the embodiment shown in FIG. 1, 0 or negative can be generated by simple comparator (if B>=A then A−B will be either 0 or negative), difference of 1 can be determined by using the "0, 1 difference detector algorithm", shown in the previous section. This will ensure that an underflow condition does not need any subtractor and result analyzer, thereby reducing the total time needed to do the subtraction.

Downshifted Mantissa Select Signal

As described above, in the far processing path 140 at least one down shifter is needed to down shift the mantissa of the operand having a smaller exponent. Again as described above, mantissa having smaller exponent is downshifted according to result of "larger exponent—smaller exponent", since determining which exponent is larger can take a significant amount of time, to save the time, both the mantissas or downshifted. The second mantissa is downshifted according to the result of "first exponent—second exponent", and first mantissa is downshifted according to the result of "second exponent—first exponent". After downshifting the relevant downshifted mantissa can be selected, because by that time the larger exponent signal will be available. By the time the downshifting of the second mantissa and the first mantissa happens, parallel logic determines which exponent is smaller and then accordingly it selects the downshifted mantissa for the corresponding floating point operand. For the other floating point operand the ALU selects the unshifted mantissa. For the floating point operand which has a larger exponent, direct mantissa select signal goes high. For the other floating point operand, which has smaller exponent, shifted mantissa select signal goes high only if exponent difference is such that the down shifted mantissa does not result in being zero. For example, for a 32 bit mantissa, if the exponent difference is 33 then the down shifted mantissa should become zero. To achieve this, both the select signals remain low. In such a case the AND-OR logic thus passes zero as the normalized mantissa. This transfers duty of zero filling from downshifter to mantissa select multiplexer, this saves some time but makes the shifted mantissa select signal more timing critical. Block FPEC 144 does this work with a new technique and generates the same signal in lesser amount of time compared to the conventional schemes.

Following equations illustrate implementation of the new/proposed scheme for data having 8 bit exponent and 32 bit mantissa:

select_shifted_$B$=((exp$A$[7:5]==exp$B$[7:5]) and (exp$A$[4:0]>exp$B$[4:0]))

or ((exp$A$[7:5]−exp$B$[7:5]=1) and (exp$B$[4:0]>exp$A$[4:0]));

select_shifted_$A$=((exp$B$[7:5]==exp$A$[7:5]) and (exp$B$[4:0]>exp$A$[4:0]))

or ((exp$B$[7:5]−exp$A$[7:5]=1) and (exp$A$[4:0]>exp$B$[4:0]));

Wherein expA and expB are the exponents of the first and second floating point operands.

The algorithm which was illustrated above with reference to the Mantissa underflow signal generation above can be used to generate (expB[7:5]−expA[7:5]=1) and (expA[7:5]−expB[7:5]=1) signals. By using the algorithm discussed earlier with reference to the mantissa underflow section, XDIF and YDIF can be generated for expA[7:5] & expB[7:5], which gives all the desired information as shown below:

(exp$B$[7:5]−exp$A$[7:5]=1)→YDIF & ~XDIF (exp$A$[7:5]−exp$B$[7:5]=1)→XDIF & ~YDIF The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. An apparatus for performing floating-point arithmetic operations comprising:
   a near processing path circuit;
   a far processing path circuit in parallel with the near processing path circuit;
   an input data bus for providing first and second floating point operands to the near processing path circuit and the far processing path circuit substantially simultaneously, wherein each of the first and second floating point operands include a sign-bit, a mantissa, and an exponent,
   wherein the near processing path circuit generates a plurality of exponent difference signals as a function of a pattern of exponents in the first and second floating point operands, wherein the near processing path circuit generates a near path subtraction result based on the exponent difference signals,
   wherein the near processing path circuit computes an exponent difference of the first and second floating point operands, and wherein the near processing path circuit generates an exponent difference signal based on the computed exponent difference,
      wherein the near processing path circuit generates GT, LT, and EQ exponent difference signals as a function of the pattern of exponents of the first and second floating point operands based on the equations:

$GT$=(EXPsame[1] and $X$EXP[0] and ~$Y$EXP[0]) or (EXPdiffr[1] and YEXP[0] and ~XEXP[0]), $LT$=(EXPsame[1] and $Y$EXP[0] and ~$X$EXP[0]) or (EXPdiffr[1] and XEXP[0] and ~YEXP[0]), and EQ=EXPsame[0], and wherein "~" denotes inversion, EXPsame[i]=XEXP[i] xnor YEXP[i], and EXPdiffr[i]=XEXP[i] xor YEXP[i], and GT, LT, and EQ are the exponent difference signals, and
      wherein the far processing path circuit computes a mantissa difference of the first and second floating point operands, and wherein the far processing path circuit generates a far path subtraction result based on the computed mantissa difference, if the computed exponent difference is not equal to 0, 1, or −1; and
      a final result multiplexer coupled to the near processing path circuit and the far processing path circuit that selects and outputs either the far path subtraction result, the near path subtraction result, or a standard result based on the generated exponent difference signal, wherein the standard result is selected based on a status of the near path or the far path subtraction result.

2. The apparatus of claim 1, further comprising:
   an operand distribution bus coupled to the input data bus to receive the first and second floating point operands from the input data bus and to provide a plurality of exponents and mantissas corresponding to the first and second floating point operands.

3. The apparatus of claim 1, wherein the near processing path circuit generates a plurality of exponent difference signals as a function of using two least significant bits of exponents associated with the first and second floating point operands.

4. A method for performing floating-point arithmetic operations, comprising:
   receiving, on an input data bus, and second floating point operands, wherein each of the first and second floating point operands includes a sign-bit, a mantissa, and an exponent; generating, in a near processing path circuit, a plurality of exponent difference signals as a function of a pattern of exponents in the first and second floating point operands wherein generating the plurality of exponent difference signals as a function of the pattern of exponents in the first and second floating point number comprises:
      generating GT, LT, and EQ exponent pattern difference signals as a function of pattern of exponents in the first and second floating point operands using the equations:

$GT$=(EXPsame[1] and $X$EXP[0] and ~$Y$EXP[0]) or (EXPdiffr[1] and $Y$EXP[0] and ~$X$EXP[O]);

$LT$=(EXPsame[1] and $Y$EXP[0] and ~$X$EXP[0]) or (EXPdiffr[1] and $X$EXP[0] and ~$Y$EXP[0]);

EQ=EXPsame[0]

wherein "~" denotes inversion, EXPsame[i]=XEXP[i] xnor YEXP[i], and EXPdiffr[i]=XEXP[i] xor YEXP[i], and GT, LT, and EQ are the exponent difference signals;
   generating, in the near processing path circuit, a near path subtraction result as a function of the plurality of exponent difference signals;
   generating, in the near processing path circuit, normalized mantissas by shifting a mantissa associated with smaller of the two exponents associated with the first and second floating point operands;
   computing, in the near processing path circuit, a mantissa difference by subtracting the normalized mantissas of the first and second floating point operands;
   computing, in the near processing path circuit, an exponent difference by subtracting the exponents of the first and second floating point operands;
   computing, in the near processing path circuit, a far path subtraction result based on the computed mantissa difference and if the computed exponent difference is not equal to 1, −1, or 0; and
   selecting, in a final result multiplexer, either the far path subtraction result, the near path subtraction result, or a standard result as a function of the compound exponent difference, wherein the standard result is selected based on a status of the near path or the far path subtraction result.

5. The method of claim 4, wherein generating a plurality of exponent difference signals as a function of a pattern of exponents in the first and second floating point operands comprises:
   generating a GT exponent difference signal, if there is an indication of having a exponent difference of +1 between the first and second floating point operands;
   generating a LT exponent difference signal, if there is an indication of having a exponent difference of −1 between the first and second floating point operands; and
   generating an EQ exponent difference signal, if there is an indication of having a exponent difference of 0 between the first and second floating point operands.

* * * * *